Feb. 4, 1936.   F. N. BARD ET AL   2,029,404
REVERSE GEAR
Filed April 29, 1933
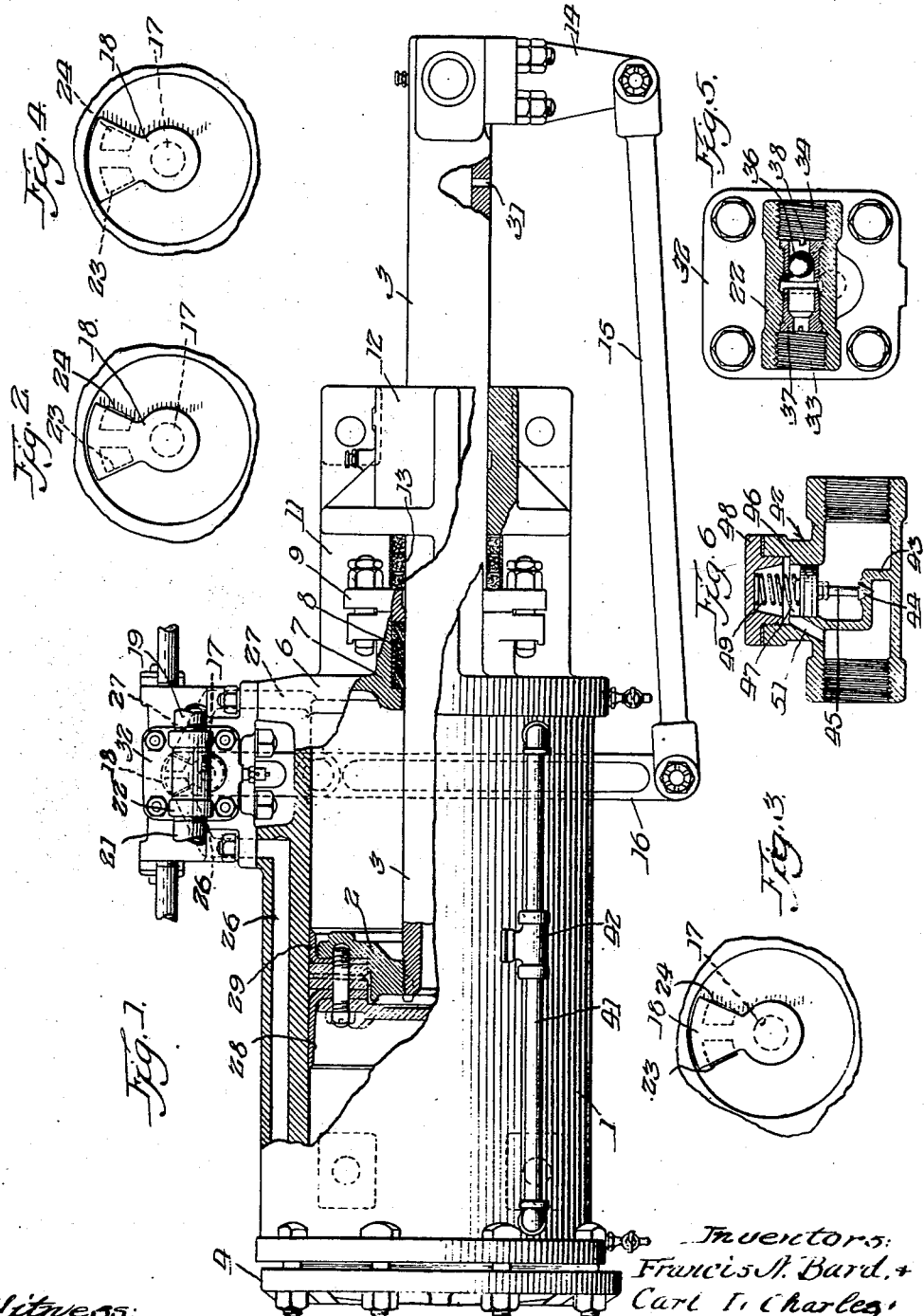
Witness:
R. B. Davis
Inventors:
Francis N. Bard, +
Carl T. Charles,
Thomas C. Gray.
By Wilson, Dowell, McKenna + Lorch
Attys Patented Feb. 4, 1936

2,029,404

UNITED STATES PATENT OFFICE 2,029,404

REVERSE GEAR

Francis N. Bard, Highland Park, Carl L. Charles, Chicago, and Thomas C. Gray, Evanston, Ill., assignors to Barco Manufacturing Co., Chicago, Ill., a corporation of Illinois Application April 29, 1933, Serial No. 668,508

5 Claims. (Cl. 121—38)

Our invention relates to power reverse gears used for shifting valve motions of locomotives, although other applications will be apparent to those skilled in this and allied arts.

Reverse gears for this use should have the ability to respond to or reposition themselves promptly and accurately to a minimum and practically effortless movement of the reverse gear lever by the engineer and to maintain a set position even though subject to vibrations.

It is the purpose of our invention to provide a compact reverse gear of simple construction which will be efficient, sensitive and reliable in operation; and which will not be subject to creepage of the piston resulting from unequal piston areas.

A more comprehensive understanding of our invention will be obtained from the following description in connection with the drawing, in which:

Fig. 1 is a side elevation of a power reverse gear constructed in accordance with this invention, certain parts being broken away to illustrate the interior construction, Fig. 2 is a fragmentary detail of the rotary valve illustrating one possible setting thereof, Fig. 3 is a similar view illustrating another possible setting of the valve, Fig. 4 is a similar view illustrating a third possible setting of the valve, Fig. 5 is a vertical section through the automatic two-way connection, and Fig. 6 is a vertical sectional view of the pressure differential valve.

Referring more specifically to the drawing which illustrates a power reverse gear embodying the novel features of this invention, reference character 1 designates a cylinder having a piston 2 mounted for reciprocatory movements therein carried upon one end of a hollow relatively large piston rod 3. One end of the cylinder is sealed by a head 4 and the other by a head 6 formed with an integral packing box 7 surrounding the rod immediately adjacent head 6. The packing box contains standard chevron type packing rings 8 compressed by a flanged gland 9.

The end or head 6 carries an integral extension 11 provided at its outer extremity with a bearing 12 surrounding and supporting the piston rod beyond the stuffing box. An oil swab 13 may be placed around the piston rod, if desired, between the stuffing box and the outboard bearing 12.

The outer end of piston rod 3 carries the usual floating link bracket 14 to which is pinned one end of the floating link 15, the other end being pinned to the floating lever 16 connected to the valve shaft 17 by which both the rotary valve 18 and the exhaust valves (not shown) are actuated. Lever 16 is also connected to the cab reach rod in the usual manner. Rotary valve 18 and the poppet valves control the inlet to and exhaust from cylinder 1, the pressure being supplied through either pipe 19 or 21 and fitting 22, as will be hereinafter described, and through ports 23 and 24 communicating with ducts 26 and 27 leading to the two ends of the cylinder.

The entire valve mechanism for controlling the reverse gear and the ports on top of the gear connecting with the valve mechanism are symmetrically disposed so that the valve may be reversed with respect to the cylinder, making it possible to put the control rods, levers and links upon either side of the cylinder.

Piston 2 is of the type carrying two cup leathers or packings 28 and 29 to prevent leakage between the piston and cylinder in each direction, the latter being on the side from which the piston rod projects and the former being upon the opposite side. Leather 28 is appreciably longer or deeper than leather 29 to create an added frictional resistance to compensate for the increased area on that side of the piston, due to the absence of the piston rod. It will be apparent that the additional leather area in contact with the cylinder wall, the leather being forced against the cylinder wall by the pressure within the cylinder, will produce a frictional resistance against movement of the piston toward the right, as viewed in Fig. 1. The amount of additional packing area in contact with the cylinder wall is calculated to offset or compensate for the additional piston area and thus eliminates the otherwise natural tendency of the piston to creep toward the right, as viewed in Fig. 1.

To insure the greatest possible pressure differential between the two sides of the cup leathers and therefore insure perfect sealing of the cup leathers against the cylinder walls, the interior of the piston rod which communicates with the interior of the piston head is vented to the atmosphere by means of a port 31 which relieves the interior of the piston rod and piston head of any pressure that might otherwise build up therein and tend to prevent perfect sealing of the cup leathers. For this purpose communication between the interior of the rod and the space between the cup leathers is established through a space between the body of the piston and its cap and through radial passages provided in the ring block between the cup leathers as illustrated in Fig. 1.

By compensating for the additional piston area upon one side of the piston it is possible to use a valve proportioned as illustrated in Fig. 2 wherein the valve when in normal position or position of rest has a lead on port 24 which communicates with the smaller piston area and is lapped over port 23. This valve dimension contributes toward a very sensitive reverse gear in which both sides of the piston are under pressure, one end being trapped or closed and the other end open to the line pressure because of the "lead" when the gear is at rest. The gear is therefore subject to being put into immediate motion. If the additional piston area were not compensated for the piston would not come substantially to immediate stop but would have a tendency to creep or move to the right against the supply pressure until the pressures on the two faces of the piston multiplied by their respective piston areas became equal. The compensated piston disclosed causes the gear to come to rest and remain there without creeping.

The employment of our compensated piston becomes of great importance in connection with the valve and seat proportions shown in Fig. 3 in which the valve has a lead to both ports, thus placing both sides of the piston under line pressure when the valve is at rest. Tests have demonstrated that this is the most sensitive gear. It is obvious that if the piston were not compensated and the valve had a lead to both ports the piston would continue moving toward the right, as shown in Fig. 1 until the pressures multiplied by their respective areas became equal.

In some installations it may even be desirable to have the valve and valve seat proportioned as shown in Fig. 4 in which the valve laps both ports. The compensated piston in this instance causes the piston to come to substantially an immediate stop because the effect of the larger area is compensated for by the increased friction, whereas if the piston were not compensated it would continue to move until the pressures multiplied by their respective piston areas became equalized.

On locomotives both air and steam are available for the operation of the reverse gear. Should one source fail while the locomotive is in operation it is obviously impossible from a practical viewpoint for the engineer to stop and make repairs. It is desirable, therefore, that either be capable of use at will so that if one fails resort to the other may be instantly had. Our invention contemplates a connection constructed to prevent back flow from one pressure line into the other, thereby enabling the engineer to switch from one source to the other at will should failure occur in one source.

For this purpose we provide a two-way connection or fitting 22 which, in the present instance, is illustrated as being formed integrally with the valve cap 32. The fitting is provided with a pair of inlets 33 and 34 which communicate with the valve chamber (not shown) formed in the rear of the cap. The inlets are controlled by a ball check 36 freely mounted between a pair of removable seats 37 and 38 screwed into the two inlets. In normal operation the check valve will be moved by the pressure of the supply fluid being used to close the inactive fluid line and prevent back flow into such line of the fluid being used. Should the source of fluid being used fail, fluid under pressure from the other source may be immediately turned on whereupon the valve will be automatically forced against the other seat to close the then idle line and permit continuance of operation without immediate repairs.

When the valve and seat are proportioned as disclosed in Fig. 2 a higher unit fluid pressure will exist on the piston rod side than on the opposite side of the piston because the piston rod side is exposed to supply pressure while the pressure on the opposite side has been reduced through expansion.

For the purpose of quickly establishing the requisite pressure differential between the opposite sides of the piston so as to prevent creepage of the piston, our invention contemplates a differential valve between the two sides, as shown in Figs. 1 and 6.

The cylinder spaces at opposite sides of the piston are accordingly connected by a pipe line 41 communicating with the interior of the cylinder near the ends thereof and having interposed in its length a pressure differential valve designated generally by reference character 42, the passage through which is of sufficiently small cross-sectional area to prevent undue loss of fluid from the high pressure side of the piston when the piston is moving toward the left.

This valve, as will be apparent from Fig. 6, comprises a casing divided by a partition wall 43 which is provided with a small escape port shaped to form a seat for and be closed by a tapered valve 44 carried by a stem 45 depending from a piston 46. This piston is capable of movement in the chamber 47 formed in the body and is accessible upon removal of the closure cap 48.

The valve is loaded or normally urged toward its seat by an expansion spring 49 interposed between the piston and the cap. A port 51 establishes communication between this piston chamber and that side of the pipe line 41 which communicates with the main cylinder at the end opposed to the greater exposed area of the piston 2, or the left-hand end viewing Fig. 1.

The valve 44 will normally be held against its seat by spring 49 and should the pressure in the left-hand end of the cylinder exceed that in the right, during operation of the piston toward the right, this excess pressure exerted upon the upper face of piston 46 will hold the valve more firmly against its seat. Should the cylinder pressure in the right-hand end exceed that in the left-hand end, as it will when the valve 18 is positioned as in Fig. 2, the valve 44 will be opened to release pressure from the right-hand end into the left-hand end whenever the pressure on the lower face of piston 46 exceeds the combined force of the fluid pressure and the spring pressure on the upper face of the piston. The valve acts, therefore, as a differential valve to permit a pressure flow from the piston rod side to the opposite side of the piston 2 until the desired pressure differential has been established. The desired differential is such that the effective areas of the two faces of the piston multiplied respectively by the pressures exerted thereon will be equal. The pressure on the right face will obviously be greater than that on the left face, and spring 49 is set to limit the right face pressure to a constant degree above the left face pressure.

Our invention provides a construction and arrangement whereby the usual and expensive cross head construction for supporting the piston rod may be dispensed with. The bearing provided upon the cylinder extension guides and supports the piston rod and takes the wear off the packing and packing gland.

The unbalanced frictional resistance created by the added size of the cup packing upon one side of the piston compensates for creepage or tendency of the piston to move away from the larger area.

The two-way supply fitting is fully automatic in operation, that is, it requires no manual operation by the engineer and thus makes it possible to continue a run without road repairs even upon the failure of one source of supply to the reverse gear. This latter feature is extremely important in maintaining continuous service.

The differential valve permits the quick establishment of the requisite pressure differential between the piston rod side of the piston and the opposite side.

Other novel features of construction and their resultant advantages will be apparent to those skilled in the art, to whom it will also be obvious that minor changes may be made in the details of construction without departing from the spirit and scope of this invention as defined in the appended claims.

We claim:

1. In a fluid power reverse gear, a cylinder, a piston mounted for reciprocatory movements therein, a piston rod extending from one side of said piston through one end of said cylinder, and means for resisting movement of said piston toward the end of said cylinder through which the piston extends to compensate for the difference in effective areas of the two sides of the piston.

2. In a fluid power reverse gear, a cylinder, a piston mounted for reciprocatory movements therein, a piston rod extending from one side of said piston through one end of said cylinder, and means for frictionally resisting movement of said piston toward the end of said cylinder through which the piston extends to compensate for the difference in effective areas of the two sides of the piston.

3. In a fluid power reverse gear, a cylinder, a piston mounted for reciprocatory movements therein, a piston rod extending from one side of said piston through one end of said cylinder, and means actuated by the pressure within the cylinder for resisting movement of said piston toward the end of said cylinder through which the piston extends to compensate for the difference in effective areas of the two sides of the piston.

4. In a fluid power reverse gear, a cylinder, a piston mounted for reciprocatory movements therein, a piston rod extending from one side of said piston and through one end of said cylinder, means for sealing the piston against the leakage during movement of said piston in each direction, said sealing means offering more resistance to movement of the piston in one direction than in the other direction.

5. In a fluid power reverse gear, a cylinder, a piston mounted for reciprocatory movements therein, a piston rod extending from one side of said piston and through one end of said cylinder, means for sealing the piston against leakage in each direction of movement of the piston, said means comprising a pair of cup packings, the packing upon the side of the piston away from said rod being of greater depth than the other of said packings.

FRANCIS N. BARD.
CARL L. CHARLES.
THOMAS C. GRAY.